June 17, 1930.    R. B. FAGEOL    1,763,767
VEHICLE
Original Filed Jan. 20, 1922    4 Sheets-Sheet 1

WITNESS
H. Sherburne

INVENTOR
ROLLIE B. FAGEOL.
BY
White Prost & Evans
his ATTORNEYS

June 17, 1930.  R. B. FAGEOL  1,763,767
VEHICLE
Original Filed Jan. 20, 1922  4 Sheets-Sheet 2
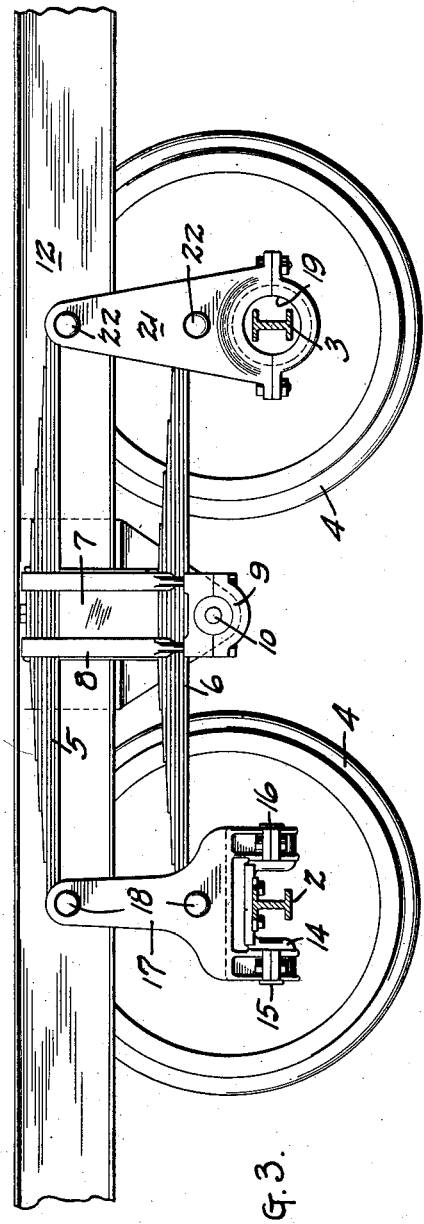
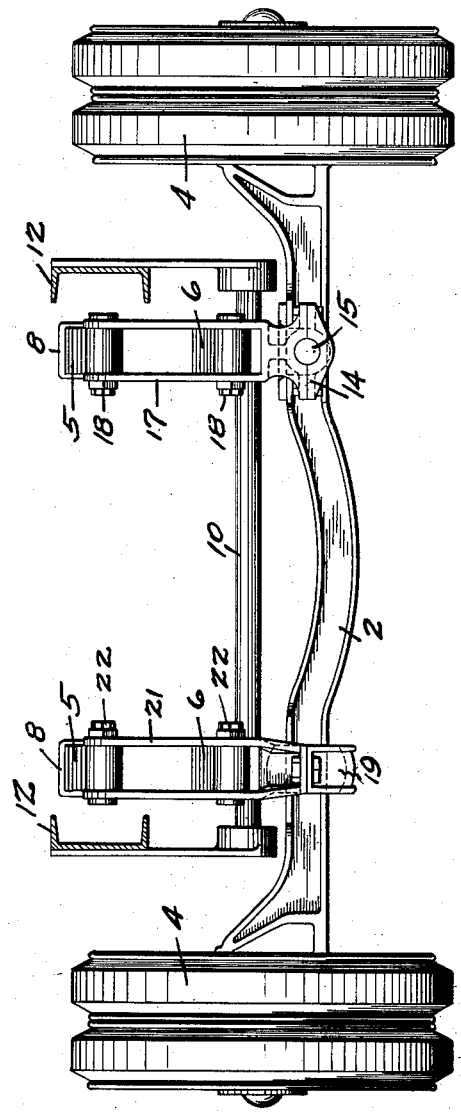
WITNESS
H. Sherburne
INVENTOR
ROLLIE B. FAGEOL
BY
White Prost & Evans
his ATTORNEYS

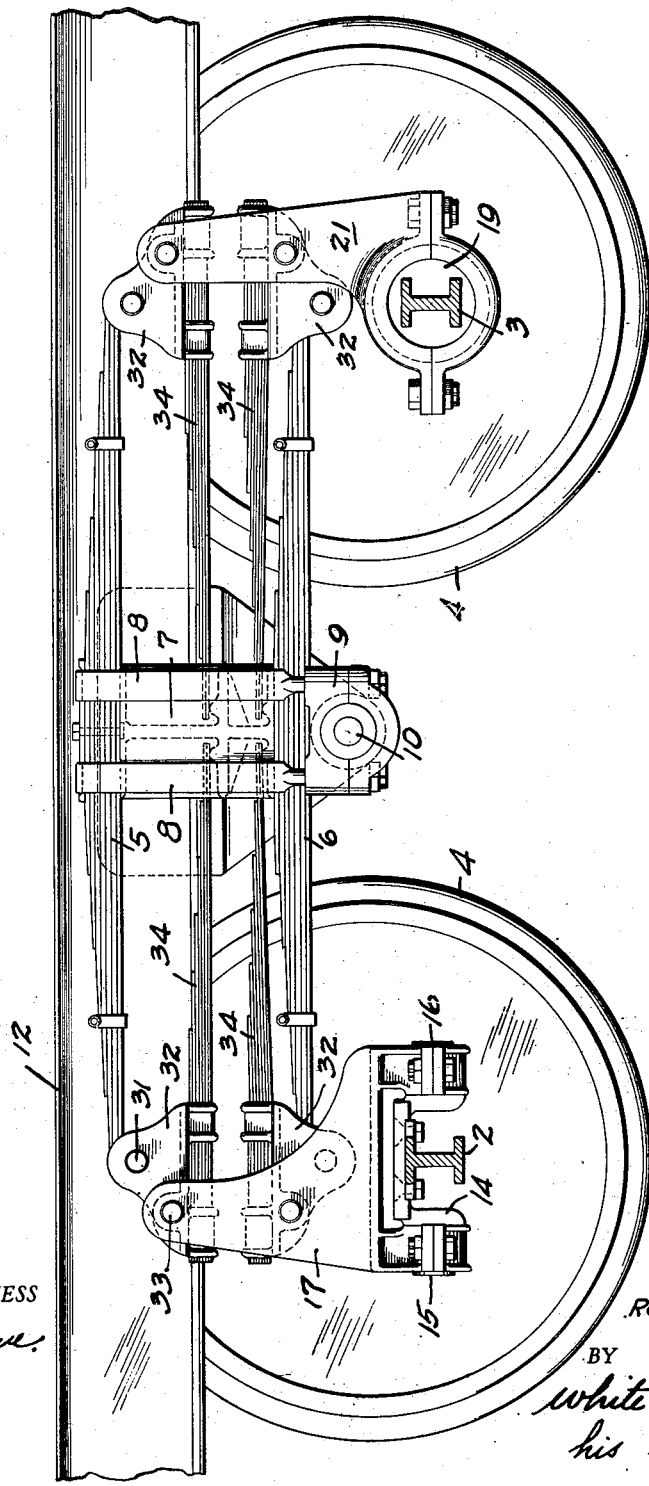

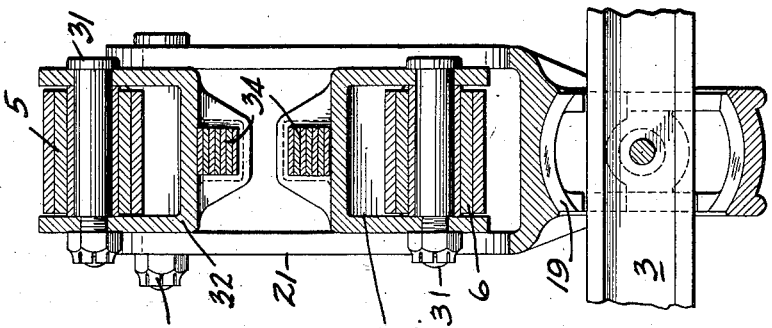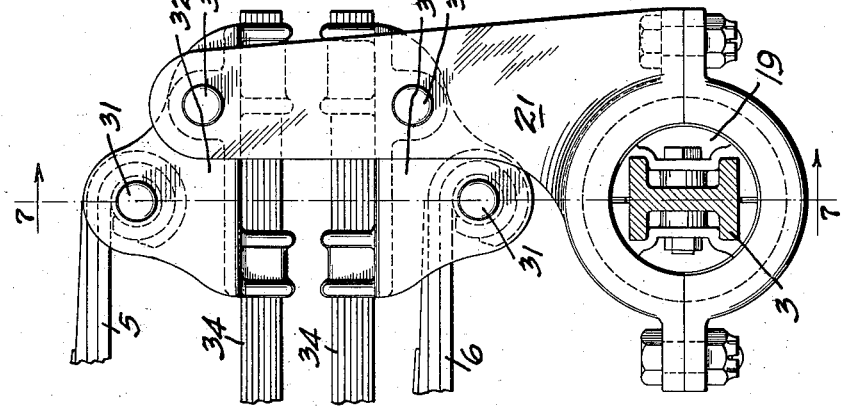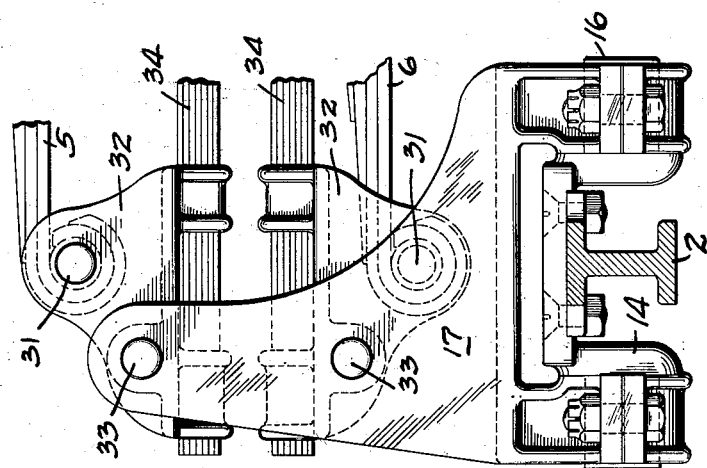

Patented June 17, 1930

1,763,767

UNITED STATES PATENT OFFICE

ROLLIE B. FAGEOL, OF LOS ANGELES, CALIFORNIA

VEHICLE

Application filed January 20, 1922, Serial No. 530,554. Renewed March 2, 1928.

The invention relates to vehicles and particularly to road vehicles of the type shown in my copending application Serial No. 512,243, filed November 2, 1921, now Patent Number 1,660,188, granted February 21, 1928. In said prior application I have shown an eight wheeled vehicle in which the wheels are grouped in two units or trucks of four wheels each. The truck or unit comprises two parallel axles provided on their ends with wheels and connected together by springs, upon which the vehicle frame is supported midway between the ends of the springs. The present invention has particular relation to the truck construction.

An object of the invention is to improve and simplify the truck construction by eliminating the torque rods connecting the axles of the trucks.

Another object of the invention is to provide a four wheel vehicle truck in which the springs function to provide a resilient connection between the vehicle frame and the axles and also to so connect the axles that they are held against rotary or tilting motion about their longitudinal axes.

Another object of the invention is to provide a spring construction which provides a spring spread of greater length than the distance between the axles, thus improving the riding qualities of the vehicle.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one embodiment of my invention, but it is to be understood that I do not limit myself to such form, since the invention, as expressed in the claims, may be embodied in a plurality of forms.

Referring to said drawings:

Fig. 2 is a transverse vertical section of the truck, taken on the line 2—2, Fig. 1.

Fig. 3 is a longitudinal, vertical section of the truck, taken on the line 3—3, Fig. 1.

Fig. 4 is a longitudinal, vertical section of a truck provided with a modified form of spring suspension.

Fig. 5 is an elevation, on a larger scale, of the spring mounting at one end of the spring shown in Fig. 4.

Fig. 6 is an elevation, on a larger scale, of the spring mounting at the other end of the spring shown in Fig. 4.

Fig. 7 is a section taken on the line 7—7, Fig. 6.

Figure 1:
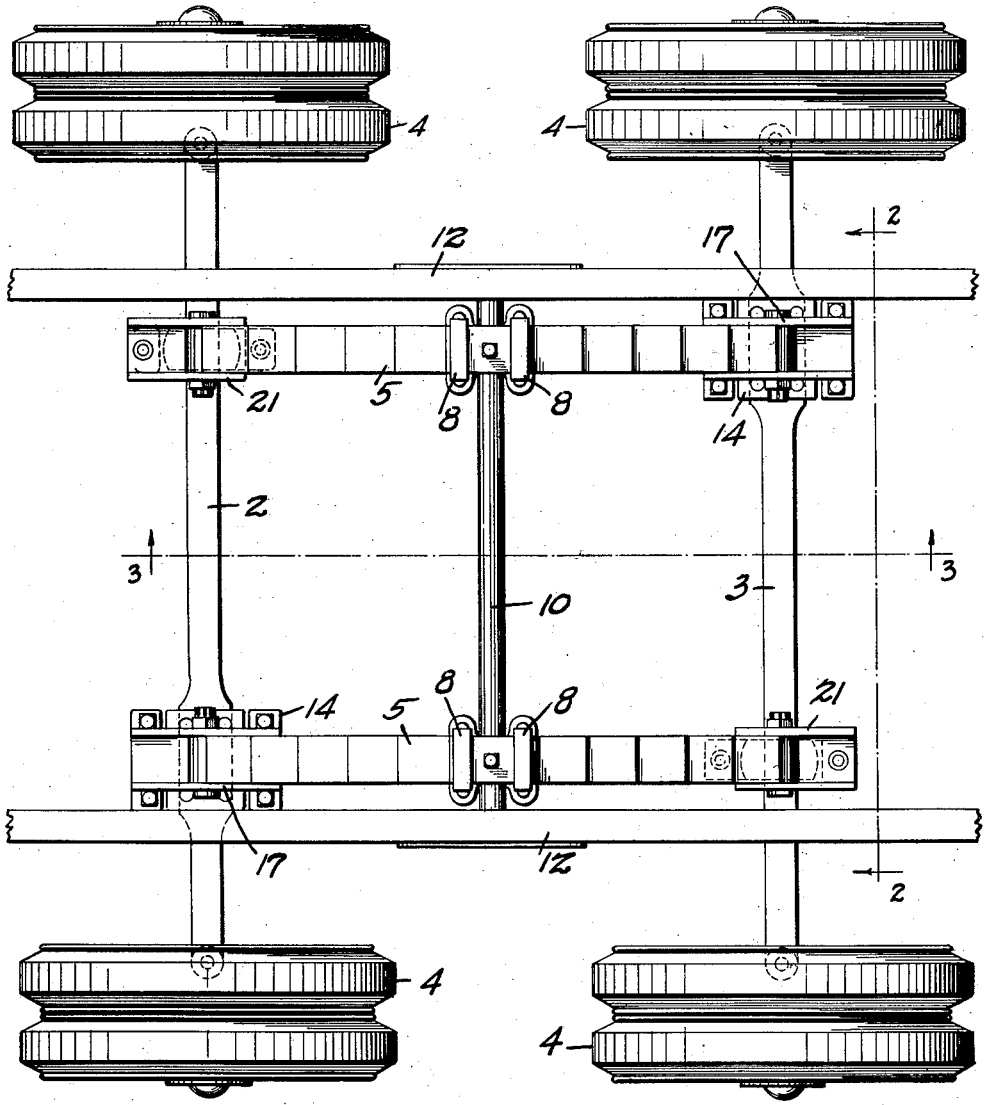
Figure 1 is a plan or top view of a four wheel truck embodying my invention.

In the drawings, I have shown the invention embodied in a four-wheel front truck having dead axles and steerable wheels mounted on the ends thereof, but it is to be understood that the invention is equally applicable to rear trucks having driving wheels. In the latter construction, the ends of the springs are connected to the drive axle housings.

There are always undesirable forces present during running which tend to rotate vehicle axles about their axes. These forces are greatest in drive axles or in axles, either dead or driven, which carry brakes, and in such cases are known as "driving torque" and "braking torque" respectively. Even when front or dead axles are devoid of brake connections, there are rotative forces, due to such inherent and unavoidable elements as friction, still present in quite a marked degree. For these reasons it is contemplated that this invention shall be used on any and all forms of vehicle trucks.

As the wheels of a truck move over an uneven road or surface, the axles move in a vertical plane with respect to each other and with respect to the vehicle frame, and assume different relative angular positions in the vertical plane. With the ends of the springs rigidly secured to the axles, this movement of the axles would twist and probably break the leaves of the spring. To overcome this condition I provide a flexible connection between the axles and the ends of the springs, so that relative angular movement of the axles and the frame will not twist the end of the spring. It is essential however, to hold the axles or axle housings against rotation or oscillation of any great magnitude about their longitudinal axes. Rotation of a front axle will change the angle of the steering knuckle pin with respect to the vertical and thus interfere with the steering of the vehicle. In accordance with my invention, the axles of a truck are permitted to assume varying relative angular positions in the vertical plane, but are held substantially fixed against rotation on their longitudinal axes, by the mounting of the springs.

The truck comprises two parallel spaced axles 2—3, each axle being provided on its ends with wheels 4. The two axles are connected together at opposite sides by two pairs of leaf springs 5—6, the springs of each pair being superposed in spaced relation. At their centers, the two springs of each pair are spaced apart by a block 7 and secured together by the bolts 8, which also secure the bearing block 9, to the springs. Secured to the vehicle frame 12, at opposite sides, are brackets in which a transverse shaft 10, which passes through the bearing blocks 9 is mounted. The truck is thus pivoted centrally, on a transverse shaft secured to the vehicle frame. This construction is fully shown and described in my aforementioned application.

The springs are connected at their ends to the axles in such manner that the axles are freely movable vertically, but restrained from rotary movement. This is accomplished by connecting one end of a pair of springs to one axle by a universal joint and the other end to the second axle by a pivoted joint and by connecting one end of the other pair of springs to the first axle by a pivoted joint and to the second axle by a universal joint. Secured to one axle 2, at one side thereof is a trunnion member 14 having two trunnions or stub shafts 15—16, extending horizontally therefrom at right angles to the axis of the axle. Journaled on the trunnions 15—16, is a shackle 17 to which the ends of the superposed springs are pivotally attached by the bolts 18. Secured to the other axle 3, at the same side thereof, is a ball or spherical surfaced bearing member 19 which is engaged by a shackle 21 having a complementary shaped concave spherical bearing surface, so that the shackle has a limited universal movement with respect to the axle 3. The other ends of the springs 5—6 are pivotally connected to the shackle 21 by bolts 22. This pair of springs thus prevents the axle 2 from rotating on its axis and prevents the distance between the axles from being varied except by variation in flexure of the springs, but otherwise leaves the axles free to move.

On the other side of the vehicle, the trunnion member 14 is secured to the axle 3, and the ends of the springs attached thereto by the shackle 17 and the spherical bearing member 19 is secured to the axle 2 and the other ends of the springs attached thereto by the shackle 21. Thus each axle is provided on one side with a trunnion bearing member and on the other side with a spherical bearing member, so that both axles are supported as set forth.

In Fig. 4, I have shown a modified form of construction, which provides for improved riding qualities of the vehicle, by producing a spring span which is longer than the axle span and by producing a resilient connection between the ends of the main leaf springs and the spring shackles. Interposed between each end of each main leaf spring and its associated shackle, is a long, flexible leaf spring formed of thin leaves that readily absorbs the smaller shocks incidental to road travel and lessens the intensity of the larger shocks. One end of the spring 5 is journaled on a bolt 31 arranged in the housing 32, which is fulcrumed on a bolt 33 carried by the shackle 17. Secured to the housing 32 is a long, flexible leaf spring 34 of gradually increasing flexibility from the rigid end, secured to the housing, to its outer end. The outer end of the spring 34 seats in a pocket in the block 7. The bolt 31 is positioned in the vertical plane of the axis of the axle 2 and the bolt 33, which forms the fulcrum for the compound lever formed by the rigid housing 32 and the flexible spring 34, is spaced from the vertical plane on the side remote from the other axle, so that the spring span is greater than the axle span. The same end of the spring 6 is journaled in a similar housing 32 mounted on the shackle 17 in the same manner as above described, so that the ends of both springs are resiliently connected to the shackle 17. Similar auxiliary springs, mounted in the same manner, are interposed between the other ends of the main springs and the shackle 21, the fulcrums of all of the auxiliary springs being spaced from the vertical planes of the axes of the axles, so that the spring span is greater than the axle span. By this arrangement and by virtue of the interposition of the long flexible auxiliary springs, the riding qualities of the vehicle are greatly improved and short sharp jolts are not transmitted to the vehicle frame.

I claim:

1. In a vehicle, a truck comprising two transverse axles, wheels on said axles, spring mountings connected to said axles, leaf springs spanning the space between the axes of said axles and auxiliary spring housings fulcrumed on said mountings beyond the axes of the axles and pivotally connected to the ends of said springs.

2. In a vehicle, a truck comprising two spaced transverse axles, wheels on said axles, spring mountings movably attached to said axles, a pair of superposed longitudinally disposed main leaf springs disposed between said mountings and auxiliary leaf spring housings disposed between the ends of the main springs and said mountings.

3. In a vehicle, a truck comprising two spaced transverse axles, wheels on said axles, spring mountings movably attached to said axles, a pair of superposed longitudinally disposed main leaf springs disposed between said mountings and auxiliary leaf spring housings fulcrumed to said spring mountings adjacent one end of the auxiliary spring housings, and means pivotally connecting the ends of the main leaf springs to said auxiliary spring housings intermediate the ends thereof.

4. In a vehicle, a truck comprising two axles, a leaf spring connecting said axles at one side, said spring being pivotally connected to the first axle and universally connected to the second axle and a second leaf spring connecting said axles at the other side, said second spring being pivotally connected to the second axle and universally connected to the first axle.

5. In a vehicle, a truck comprising two parallel axles, leaf springs extending between said axles at opposite sides thereof, pivoted joints connecting two opposite ends of the springs with the two axles and ball and socket joints connecting the other two ends of the springs with the two axles.

6. In a vehicle, a truck comprising two transversely disposed parallel axles, spring shackles mounted on one end of the first axle and the other end of the second axle by universal joints, spring shackles mounted on the other ends of said axles by pivoted joints having longitudinally extending pivots and load supporting leaf springs connecting the shackles.

7. In a vehicle, a truck comprising two transversely disposed parallel axles, a spring shackle pivoted to one end of the first axle by longitudinally extending pivots, a spring shackle similarly pivoted to the other end of the second axle, a spring shackle attached to the other end of the first axle from the pivoted shackle by a universal joint, a spring shackle similarly attached to the other end of the second axle, and leaf springs connecting the shackles on one axle with the dissimilar shackles on the other axle.

8. A vehicle comprising a pair of substantially parallel axles; spring supporting members secured to said axles and shaped to increase the span between said supporting members beyond the span between said axles; a plurality of leaf springs connected to said supporting means, and comprising the sole means for limiting the relative spread and for resisting the rotating tendency of said axles; and a frame pivotally supported from said springs.

9. A spring mounting comprising a support; a member pivotally secured to said support; a leaf spring with one end thereof connected to said member; and resilient means resisting the pivotal movement of said member.

10. The combination as set forth in claim 9 in which said resilient means comprises a flat leaf spring.

11. A spring mounting comprising a pair of spaced supports; a member movably connected to each support; a leaf spring connected at ends with said members; and resilient means for resisting the movement of said members with relation to said supports.

12. The combination as set forth in claim 11 in which said resilient means comprises a pair of flat leaf springs.

13. A spring mounting comprising a pair of spaced supports; a member pivotally secured to each support; a leaf spring connected at its ends with said members; an auxiliary leaf spring with one end thereof secured to each of said members; and a supporting member for the free ends of said auxiliary springs secured to said first mentioned spring.

14. A spring mounting comprising a pair of spaced supports; a plurality of members pivotally secured to each support; a plurality of leaf springs supported by said members; and resilient means resisting the movement of each of said members with relation to said supports.

15. The combination as set forth in claim 14 in which said resilient means comprises an auxiliary leaf spring with one end thereof secured to each of said members; together with means secured to said first mentioned leaf springs supporting the free ends of said auxiliary leaf springs.

16. In motor vehicle construction wherein the forces tending to rotate an axle about its axis are transmitted through the spring suspension in combination with a chassis, an axle and springs connected to the chassis and to the axle, means permitting movement of the axle as the springs deflect to connect the spring at one side of the vehicle to the axle so that rotation of said axle about its longitudinal axis is prevented and means to connect the spring at the other side of the vehicle to the axle with capacity for freedom of angular movement.

17. In motor vehicle construction, wherein the forces tending to rotate an axle about its longitudinal axis are transmitted through the spring suspension, in combination with a chassis, an axle and springs connected to the chassis and to the axle, means to connect the springs at one side of the chassis adjacent one end of the axle so that the axle is free to swing in a vertical plane, but is rigidly held from rotation about its longitudinal axis, and means to connect the spring at the other side of the vehicle to the axle with capacity for freedom of angular movement in all directions.

18. A multi-wheel road vehicle comprising a frame, two spaced axles extending transversely of said frame and supporting one end thereof, springs interconnecting said frame and axles at each side of the vehicle, the springs at one side of the vehicle being connected to one of said axles by means that permits the universal movement of said axle with respect to the springs and being connected to the other of said axles by means that prevents rotation of said axle about its longitudinal axis, the springs on the opposite side of the vehicle being connected to said last named axle by means that permits said axle to rotate freely about its longitudinal axis, the other axle on the last mentioned side of the vehicle being connected to the springs by means that prevents said axle from rotating about its longitudinal axis.

19. A multi-wheel road vehicle, wherein the forces tending to rotate the axles about their axes are transmitted through the spring suspension, comprising a frame, a pair of axles arranged to support one end of said frame, springs connecting the frame and the axles adjacent opposite sides of said frame, the springs at one side of said frame being connected to one of said axles by means that permits the axle to rotate freely about its longitudinal axis and being connected to the other axle at that side of the frame by means that prevents the rotation of that axle about its axis, the springs at the other side of said frame being connected to said last mentioned axle by means that permits it to turn about its axis and being connected to the other axle at that side of the frame by a means that prevents the rotation of that axle about its axis, whereby said forces are resisted without substantially preventing the angular movement of the axles with respect to each other in vertical planes.

20. A multi-wheel road vehicle, wherein the forces tending to rotate the axles about their axis are transmitted through the spring suspension, comprising a frame, a pair of axles, springs connecting the frame and axles at opposite sides of the frame, said springs being connected to the foremost axle by a universal joint at one side of said frame, and to the rearmost axle by a universal joint at the other side of said frame, and means to connect the other end of said foremost axle to said spring in a manner that prevents rotation of that axle about its axis but permits angular movement in a substantially vertical plane, and means to connect the other end of the rearmost axle to said springs by a connection that prevents the rotation of the axle about its axis, but permits angular movement of said axle in a substantially vertical plane.

21. A motor vehicle construction including a frame, a pair of axles arranged to support one end of said frame, a member non-rotatively secured to one of said axles, a member carried by the other axle, a bracket depending from said frame between said axles, a spring pivoted to said bracket between said axles, shackles pivoted to the ends of said spring and to said members, and a torque resisting element movable with respect to and reacting against said frame in substantial vertical alignment with said spring pivot and being pivotally connected to said non-rotatively secured member on one of said axles.

22. A motor vehicle construction including a frame; a pair of axles arranged to support one end of said frame; a member non-rotatively secured to one of said axles; a member carried by the other axle; a trunnion element pivotally supporting said frame; a spring supported by said trunnion element between its ends; shackles pivoted to the ends of said spring and to said members; and an element attached to said trunnion element and to said non-rotatively secured member on one of said axles, to definitely space said axle from the pivot point of said trunnion and to prevent movement thereof permitted by its shackled connection to said spring.

23. A motor vehicle construction, including a frame, a pair of axles arranged to support one end of said frame; a member secured to one of said axles; a member carried by the other axle; a bracket depending from said frame between said axles; a trunnion element pivoted to said bracket; a spring supporting said trunnion element between its ends; shackles pivoted to the ends of said spring and to said members; and a resilient element pivotally attached adjacent one end thereof to said first mentioned member and attached to said trunnion element at a point that is substantially vertically spaced from the pivot of said trunnion element, whereby said last mentioned axle is spaced from the trunnion pivot by said resilient element and held from shifting substantially with respect to the spring end to which it is shackled.

24. A motor vehicle construction, including a frame; a pair of axles arranged to support one end of said frame, a member rotatively secured to one of said axles, a member carried by the other axle, a trunnion element pivotally supporting said frame; a spring supporting said trunnion element between its ends, shackles pivoted to the ends of said spring and to said members, and a resilient element pivotally attached to said rotatively secured member on one of said axles adjacent one end of said last mentioned element and attached to said trunnion element at a point that is substantially vertically spaced from the pivot of said spring, whereby said last mentioned axle is spaced from the spring pivot by said resilient element and held from shifting substantially with respect to the spring end to which it is shackled.

In testimony whereof, I have hereunto set my hand.

ROLLIE B. FAGEOL.